United States Patent [19]

Cecil et al.

[11] Patent Number: 4,786,666

[45] Date of Patent: Nov. 22, 1988

[54] EPOXY COMPOSITIONS CONTAINING GLYCIDYL ETHERS OF FATTY ESTERS

[75] Inventors: Joseph L. Cecil; Walter J. Kurnik; Donald E. Babcock, all of Louisville, Ky.

[73] Assignee: Interez, Inc., Jeffersontown, Ky.

[21] Appl. No.: 122,060

[22] Filed: Nov. 18, 1987

[51] Int. Cl.$^4$ .................. C08G 59/22; C08G 59/42
[52] U.S. Cl. .................. 523/427; 528/103.5; 528/111.3
[58] Field of Search .................. 523/427; 528/103.5, 528/111.3

[56] References Cited

U.S. PATENT DOCUMENTS

| | | | |
|---|---|---|---|
| 3,138,566 | 6/1964 | Arnold | 528/103.5 X |
| 3,351,574 | 11/1967 | Hicks et al. | 528/103 X |
| 4,040,994 | 8/1977 | Lewis et al. | 528/103.5 |

*Primary Examiner*—Earl Nielsen
*Attorney, Agent, or Firm*—Herbert P. Price

[57] ABSTRACT

Epoxy esters which are formulated into high solids coating compositions are made from epoxy resins and fatty acids wherein the epoxy resin is made from a diglycidyl ether of a dihydric phenol and castor oil polyglycidyl ether reacted with a dihydric phenol.

9 Claims, No Drawings

EPOXY COMPOSITIONS CONTAINING GLYCIDYL ETHERS OF FATTY ESTERS

BACKGROUND OF THE INVENTION

The field of art to which this invention pertains is polymers derived from polyepoxide resins and fatty acids.

Coating compositions made from epoxy esters are well known compositions which have been used industrially and in home maintenance for many years. Epoxy esters are made by reacting a polymeric epoxy resin, which contains both epoxy groups and hydroxyl groups, with fatty acids. In some instances, the polymeric epoxy resin is made "in situ" by the reaction of a low molecular weight diepoxide with a dihydric phenol. Epoxy esters are described in a large number of patents, examples of which are U.S. Pat. Nos. 2,456,408; 2,493,386; 2,698,308 and 3,247,136.

In formulating epoxy esters into coating compositions, the esters are usually dissolved in an organic solvent at a resin solids content of 50 weight percent or less. Due to environmental concerns, there is a continuing effort to decrease the amount of solvent released to the atmosphere by increasing the solids content of coating composition.

SUMMARY OF INVENTION

This invention is directed to epoxy ester composition. In one aspect, this invention pertains to a modified epoxy ester composition. In another aspect, this invention relates to high solids epoxy ester coating compositions.

The epoxy ester composition of this invention is the reaction product of (a) a diglycidyl ether of a dihydric phenol; (b) castor oil polyglycidyl ether; (c) a dihydric phenol; (d) a monocarboxylic fatty acid; and (e) a dimer acid. The diglycidyl ether of the dihydric phenol, the castor oil polyglycidyl ether and the dihydric phenol are reacted in such amounts that the sum of the epoxide equivalents of the diglycidyl ether of the dihydric phenol and the caster oil polyglycidyl ether and the phenolic equivalents of the dihydric phenol are in the ratio of about 2:1 to about 4:3. About 70 to about 80 percent of the epoxide equivalents are derived from the diglycidyl ether of the dihydric phenol with the remainder being derived from the castor oil polyglycidyl ether. The monocarboxylic fatty acid is present in the amount of about 26 to about 42 weight percent and the dimer acid is present in the amount of about 4 to about 8 weight percent, said weight percents being based on the total weight of the components referred to hereinabove.

DESCRIPTION OF THE INVENTION

The diglycidyl ethers of dihydric phenols useful in this invention are well known in the art. These glycidyl ethers are made by reacting a dihydric phenol with epichlorohydrin, generally in excess, using caustic as the condensation and dehydrohalogenation agent. The dihydric phenols used in making the glycidyl ethers contain two phenolic hydroxyl groups and no other groups reactive under the conditions of reactions. Examples of such dihydric phenols include resorcinol, dihydroxydiphenyl, dihydroxydiphenyl ether, dihydroxydiphenyl methane, dihydroxydiphenyl ethane, p,p'-dihydroxydiphenyl propane (or Bisphenol A as it is commonly called), p,p'-dihydroxydiphenyl sulfone and the like. Such diglycidyl ethers will have epoxide equivalent weights of about 120 to about 300. A preferred diglycidyl ether is the diglycidyl ether of Bisphenol A having an epoxide equivalent weight of about 180 to about 200.

The castor oil polyglycidyl ether useful in this invention is the reaction product of castor oil and epichlorohydrin. Castor oil is a vegetable oil obtained from the seeds of the castor plant and is the triester of glycerl and substantially ricinoleic acid. Epichlorohydrin is reacted with the hydroxyl groups in the ricinoleic acid portion of the oil using a Lewis acid catalyst. The resulting chlorohydrin adduct is dihydrohalogenerated with caustic. Castor oil polyglycidyl ether is described in detail in U.S. Pat. No. 3,351,574, which is hereby incorporated by reference. Castor oil polyglycidyl ether useful in this invention has an epoxide equivalent weight of about 550 to about 700.

The dihydric phenols useful in this invention are those which are listed hereinbefore in the description of the diglycidyl ether of a dihydric phenol. The preferred dihydric phenol is Bisphenol A.

The monocarboxylic fatty acids useful in this invention are aliphatic acids which contain from about 10 to about 22 carbon atoms. The acids can be saturated or unsaturated with one to three ethylenically unsaturated groups per molecule. Examples of such acids are capric acid, lauric acid, myristic acid, palmitic acid, stearic acid, arachidic acid, behenic acid, oleic acid, linoleic acid, linolenic acid, eleostearic acid, licanic acid and erucic acid. Such acid are also named from the oils from which they are derived, such as coconut fatty acids, corn oil fatty acids, linseed fatty acids, soybean fatty acids, tall oil fatty acids and the like. Epoxy esters, which are used to prepare coating composition which dry or cure by air oxidation, are made with unsaturated fatty acids. Coating compositions which are cured with crosslinkers, such as urea-formaldehyde and melamine-formaldehyde resins, are made from epoxy esters which contain less or no unsaturation in the fatty acid portion. The use of such acids is well known in the art. Preferred fatty acids for use in this invention are tall oil fatty acids.

The dimer acids useful in this invention are dimers of unsaturated fatty acids, such as linoleic acid, linolenic acid, eleostearic acid and the like. Such acids contain an average of about 20 to about 44 carbon atoms per molecule. Although referred to as dimer acids, the compounds are mixtures of dimers and trimers with a small amount of monomer. Generally, the mixture contains at least about 80 weight percent dimer acids and about 2 to about 5 weight percent monomer with the remainder being trimer. Dimer acids are described in U.S. Pat. No. 2,482,761 which is hereby incorporated by reference.

The backbone epoxy resin which is esterified with the fatty acids is prepared by reacting the diglycidyl ether of the dihydric phenol and the castor oil polyglycidyl ether with a dihydric phenol in the equivalent ration of about 2 epoxide equivalents to one phenolic equivalent to about 4 epoxide equivalents to three phenolic equivalents. The epoxide equivalent weight of the backbone resin, if isolated, is about 500 to about 1200. A preferred epoxide equivalent weight is about 750 to about 900.

The backbone epoxy resin is prepared by heating the components at temperature of about 350° F. to about 500° F. for a time sufficient for the reaction to be completed as determined by the epoxide equivalent weight compared it to the calculated value. Catalysts typically used in "upgrade" reactions, i.e., the reaction of low molecular weight diepoxides with dihydric phenols to make higher molecular weight epoxides, are used in this reactin. Examples of such catalysts are lithium hydroxide, sodium hydroxide, potassium hydroxide, sodium carbonate, triphenylphosphine, the "onium", "sulfonium" and "phosphonium" compounds, e.g., tetramethylammonium chloride, and the like. The use of these catalysts are well known to those skilled in the art.

After the completion of the epoxide-phenol reaction, the monocarboxylic acids are added along with a small amount of esterification catalysts, e.g., sodium benzoate. Heating is conducted at a temperature of about 325° F. to about 550° F. to complete the esterification reaction. In order to facilitate the removal of water of esterification, a small amount of organic solvent which forms an azeotrope with water is added. Any of the aliphatic or aromatic hydrocarbons can be used. A preferred solvent is xylene. The esterification reaction is conducted until the acid value measures less than 10.

When the desired acid value is reached, dimer acids are added and the esterification reaction is continued until the acid value is reduced to below 10, preferably 2.5.

The amount of fatty monocarboxylic acid used in preparing the compositions is about 26 to about 42 weight percent based on the total weight of the composition. The amount of dimer acids used is about 4 to about 8 weight percent based on the total weight of the composition. Preferred amounts are about 30 to about 38 weight percent fatty monocarboxylic acid and about 5 to about 7 weight percent dimer acids.

Solvent solutions of the epoxy esters of this invention are formulated into coating compositions. It has been found that these castor oil polyglycidyl ether modified epoxy esters of this invention can be formulated into coatings having high solids at application viscosities. The compositions of this invention can be supplied to formulators at solids contents as high as 80 percent with viscosities of less than Z on the Gardner-Holdt scale. These solids and viscosities allow formulators to make varnishes and paints with low amounts of volatile solvents which enable them to meet various environmental laws pertaining to solvent emissions.

Solvents used with the epoxy esters of this invention are hydrocarbon solvents, e.g., toluene, xylene, and naphtha, alcohols, glycol ethers and ketones. A preferred solvent is xylene.

The compositions of this invention can be formulated into air-drying and baking varnishes and enamels. Air-drying compositions will contain driers such as cobalt and manganese naphthenate, which are well known in the art. Baking compositions can also contain driers as well as crosslinking additives, such as urea-formaldehyde and melamine-formaldehyde resins.

In formulating paints and varnishes, various other components, such as pigments, anti-skinning agents and anti-flooding compounds, can be added.

The following examples described the invention in more detail. Parts and percentages are by weight unless otherwise designated.

EXAMPLE 1

To a suitable reactor were added 467 parts of the diglycidyl ether of Bisphenol A having an epoxide equivalent weight of 189, 524 parts of castor oil polyglycidyl ether having an epoxide equivalent weight of 637 and 209 parts of Bisphenol A. Heat and agitation were applied raising the temperature to 200° F. Potassium hydroxide, 0.31 part of 45 percent aqueous solution, was added and the temperature was raised to 350° F. over a 20 minute period. Heating was discontinued and the temperature rose to 360° F. due to the exothermic reaction. Heat was reapplied and the temperature was raised to 400° F. Heating at 400° F. was continued for 2 hours and 15 minutes. Tall oil fatty acids, 665 parts, and sodium benzoate catalyst, 1.7 parts, were added. The temperature, which had dropped to 292° F., was raised to 325° F. and was held at this temperature for 30 minutes. Xylene, 58 parts, was added and heating was continued while distilling off the water of esterification as an azeotrope while returning water to the reactor. Heating and distillation were continued for 2 hours and 25 minutes while the reactor temperature rose to 498° F., and the acid value reached 39. Dimer acids, 135 parts, (80 percent dimer, 17 percent trimer and 3 percent monomer fatty acids) were added. Heating, with azeotropic distillation of water, was continued for one hour and 20 minutes with the temperature rising to 510° F. and the acid value reaching 2.6. Xylene, approximately 500 parts, was added to form a solution at 80 percent solids. The resulting ester solution had a Gardner-Holdt viscosity of X-Y at 25° C. and a solids content of 79.45 percent.

EXAMPLE 2

Using the same procedure described in Example 1, an epoxy ester, which contained no castor oil polyglycidyl ether modification, was made from 43.21 parts of the diglycidyl ether of Bisphenol A described in Example 1, 17.65 parts of Bisphenol A, 33.72 parts of tall oil fatty acids and 6.85 parts of dimer acids as described in Example 1. The resulting ester, when dissolved at 50 percent solids in xylene, had a Gardner-Holdt viscosity at 25° C. of X-Y.

EXAMPLE 3

A clear coating composition was prepared from the epoxy ester solution of Example 1 by adding cobalt naphthenate and manganese naphthenate driers in the amount of about 0.156 percent cobalt and 0.078 percent manganese, both as metal based on ester solids. The solution was reduced to 70 percent solids with xylene to an application viscosity of 76 $KU_s$.

A clear coating composition was also prepared from Example 2. Reduction to application viscosity of 89 $KU_s$ was 41.2 percent solids.

Films prepared from the coating composition made from Example 1 were tracked free in 6 to 24 hours and developed a pencil hardness of less than 6B in two weeks. The solvent resistance, methyl ethyl ketone double rubs, was 12 after two weeks. Comparable films made from the Example 2 epoxy ester were tack free in 3 hours and developed pencil hardness of HB after two weeks. The solvent resistance after two weeks was 6 methyl ethyl ketone double ribs.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. An epoxy ester composition comprising the reaction product of:
   (a) a diglycidyl ether of a dihydric phenol;
   (b) castor oil polyglycidyl ether;
   (c) a dihydric phenol;
   (d) a monocarboxylic fatty acid; and
   (e) a dimer acid, wherein the sum of the epoxide equivalents of (a) and (b) and the phenolic equivalents of (c) are in the ratio of about 2:1 to about 4:3; wherein about 70 to about 80 percent of the epoxide equivalents are derived from (a) and the remainder from (b); wherein (d) and (e) are present in the amount of about 26 to about 42 weight percent (e), said weight percents being based on the total weight of (a), (b), (c), (d) and (e).

2. The composition of claim 1 wherein:
   (a) the diglycidyl ether of the dihydric phenol has an epoxide equivalent weight of about 180 to about 200, wherein
   (b) the castor oil polyglycidyl ether has an epoxide equivalent weight of about 550 to about 700, wherein
   (c) the monocarboxylic fatty acid contains about 10 to about 22 carbon atoms, and wherein
   (d) the dimer acid is a dimer of unsaturated monocarboxylic fatty acids and contains an average of about 20 to about 44 carbon atoms per molecule.

3. The composition of claim 1 wherein (d) the monocarboxylic fatty acid and (e) the dimer acids, are present in the amount of about 30 to about 38 weight percent (d) and about 5 to about 7 weight percent (e).

4. The composition of claim 1 wherein (a), the diglycidyl ether, is a diglycidyl ether of Bisphenol A having an epoxide equivalent weight of about 180 to about 200 and (c) the dihydric phenol, is Bisphenol A.

5. The composition of claim 1 wherein (d), the monocarboxylic fatty acid, is tall oil fatty acids.

6. The composition of claim 1 wherein the reaction product of (a) the diglycidyl ether of the dihydric phenol, (b) the castor oil polyglycidyl ether and (c) the dihydric phenol before esterification with (d) the monocarboxylic fatty acid and (e) the dimer acid has an epoxide equivalent weight of about 500 to about 1200.

7. The composition of claim 6 wherein the epoxide equivalent weight is about 750 to about 900.

8. A solution of the composition of claim 1 in an organic solvent.

9. The solution of claim 8 wherein the organic solvent is xylene.

* * * * *